United States Patent [19]

Moorhouse

[11] 4,409,699

[45] Oct. 18, 1983

[54] POWER TOOL WASTE COLLECTOR

[76] Inventor: Arnold E. Moorhouse, 81 East End Ave., Hicksville, N.Y. 11801

[21] Appl. No.: 294,529

[22] Filed: Aug. 21, 1981

[51] Int. Cl.³ .............................................. A47L 9/06
[52] U.S. Cl. .................................... 15/415 R; 15/339; 51/273; 144/252 R; 408/67
[58] Field of Search ............................ 15/339, 415 R; 144/252 R; 408/67; 51/273

[56] References Cited

U.S. PATENT DOCUMENTS 4,088,164  5/1978  McCord, Jr. .................... 144/252 R
4,184,226  1/1980  Loevenich ........................ 15/339 X Primary Examiner—Chris K. Moore
Attorney, Agent, or Firm—Michael I. Kroll

[57] ABSTRACT

A power tool waste collector is provided that vacuums up sawdust particles and the like. Said invention consists of a base affixed to a power tool having an aperture, a vacuum hose neck and track; a platform having an aperture and an air chamber slidably attached to the track of the base; a first post affixed to the rear of the base; a second post affixed to the rear of the platform; and a tension spring attached between the first post and the second post.

2 Claims, 6 Drawing Figures

POWER TOOL WASTE COLLECTOR

BACKGROUND OF THE INVENTION

1. Field of the Invention

The instant invention relates to an apparatus that is used to guide power tools when in use and to provide a means to attach an outside vacuum system to it to remove sawdust, small pieces of wood, etc. from the workpiece.

2. Description of the Prior Art

The prior art is exemplified by examples of devices used to vacuum up dust but are quite complicated, bulky and expensive. The present day vacuum devices have to be built into the power tools. Examples are routers, belt sanders, pad sanders, etc., where the vacuum system draws dust up through the handle and is deposited into a bag.

The instant invention however offers a substantial improvement over the prior art as more fully described hereinafter.

Accordingly, it is an object of this invention to provide a more suitable type of power tool waste collector that is economical, adapatable to existing power tools and easy to use.

SUMMARY OF THE INVENTION

In the present invention the disadvantages of the prior art are overcome by providing a power tool waste collector that may be used to vacuum up sawdust and the like and also be attached to the standard tool for guiding the tool when using it. Said power tool waste collector may additionally be used in conjunction with any type of vacuum system that just plugs into the device.

The power tool waste collector consists of a base attached to any type of power tool that makes by products that are not needed such as wood chips, etc. The base is provided with a neck and a hose is connected into the neck which is attached to a vacuum system that is not part of the invention. A slidable platform having an aperture and air chamber to allow the by products to travel into the neck and vacuum system. A post is connected to the base and another to the platform and is biased with a spring.

Said power tool waste collector can be used for example on a router for two different functions. On one type it is used for cutting the wood workpiece edges and on another type it is used for cutting grooves across the top of a wood workpiece. In both cases the vacuum system is connected to it.

Said power tool waste collector is considerably easier to use and helps reduce clean up time after the power tool has done its job. The power tool waste collector is also a safety device, keeping flying particles from the workpiece away from face and eyes, by sucking them into the vacuum device.

DESCRIPTION OF THE PREFERRED EMBODIMENT

Figure 1:
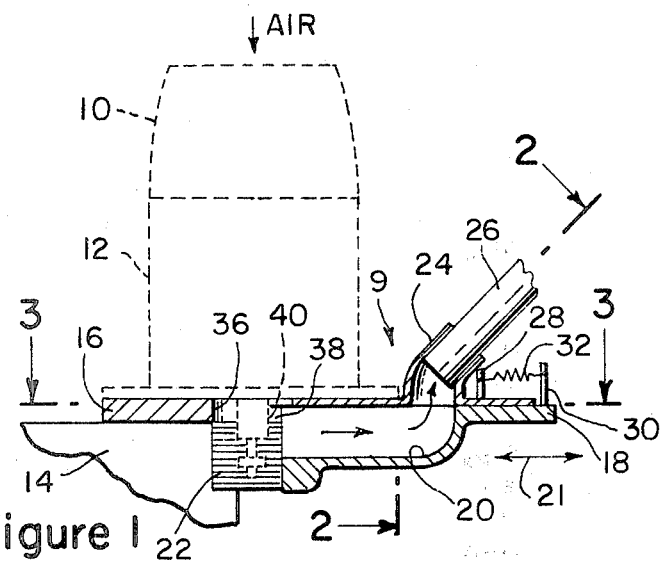
FIG. 1 of the drawing is a side cross-sectional view of one embodiment of the power tool waste collector.

Referring to FIG. 1 of the drawing a power tool waste collector is provided generally designated 9. A power tool 10, for example, a router, is shown in phantom having a router base 12 also shown in phantom. The power tool waste collector 9 has a base 16 connected in some manner to the router base 12.

The base 16 has an aperture 36 to allow the cutting tool 40 to operate against the edge of a workpiece 14 toward the rear end of the base 16 is a neck 24 placed on a 45° angle to the horizontal plane of the base for connecting a vacuum hose 26. The vacuum system (not shown) slidably attaches to the bottom of the base 16 to a platform 18 having a flat aperture to allow clearance for the cutting tool 40, a dome shaped air chamber 20 and a half segment of a round hollow brush 22 affixed to the free end of the air chamber 20 (and platform 18) which is lower than the surface of workpiece 14 said brush 22 used to direct the waste material and guide it into air chamber 20.

A first post 28 is secured to the rear end of the base 16 behind the neck 24 and a second post 30 is secured to the top edge of the platform 18 that overhangs the base. A spring 32 is placed between and connected to the first post 28 and second post 30 to allow the platform 18 to slide and return to its original position as indicated by arrow 21.

Figure 2:
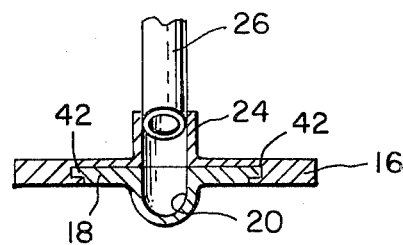
FIG. 2 of the drawing is a cross-sectional view taken on line 2—2 in FIG. 1.

FIG. 2 shows in cross-section the tongue and groove relationship between the base 16 and the platform 18 and the alignment between the dome shaped air chamber 20 and neck 24 with vacuum hose 26.

Figure 3:
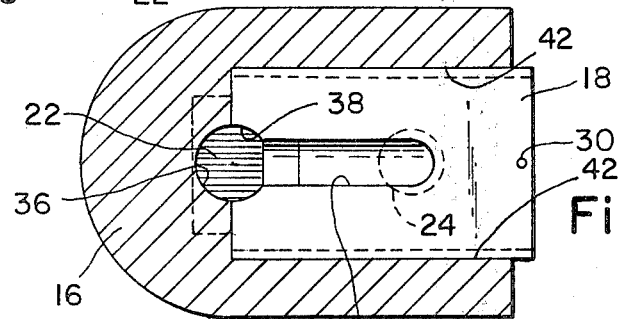
FIG. 3 of the drawing is a cross-sectional view taken on line 3—3 in FIG. 1.

FIG. 3 is a cross-sectional top view of the base 16 showing the relationship of the platform 18 to it. The aperture 36 in the base 16 is a half hole and the aperture 38 in the platform 18 is another half hole and is in conjunction with the air chamber 20 forming one continuous air passage terminating below the neck 24. Even when the platform will slide back the air will still enter the neck 24.

Figure 4:
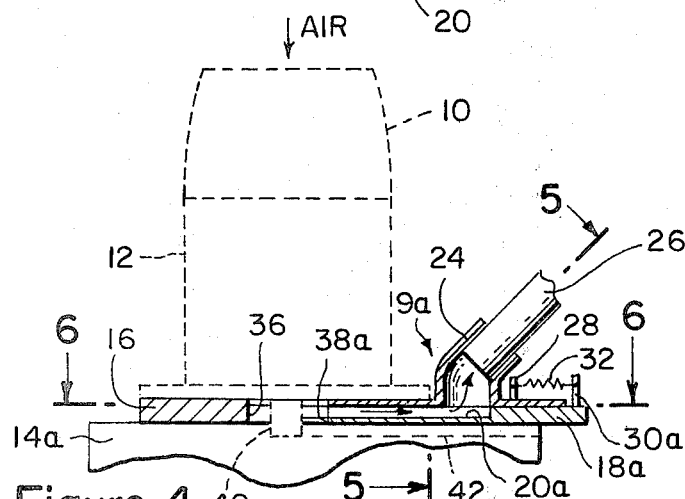
FIG. 4 of the drawing is a side cross-sectional view of another embodiment of the power tool waste collector.

FIG. 4 of the drawing shows a power tool waste collector 9a. The power tool 10, the base 12 and the power tool waste collector base 16, in the power tool waste collector 9a is the same as in FIG. 1.

Slidably attached to the bottom of the base 16 is another type of platform 18a having a flat aperture to allow clearance for the cutting tool 40, a flat air chamber 20a that is level with the base 16. In this embodiment the base 16 and platform 18a will slide over the workpiece 14a. Two tracks 42 are provided in base 16 and platform 18 and 18a to guide said platforms in base 16.

As cutting tool 40 advances into workpiece 14 platform 18 is moved out of the way when said platform 18 comes into contact with said workpiece 14 (for deep cuts) and spring 32 returns said platform 18 to its original position when cutting tool 40 is withdrawn from said workpiece 14.

The cutting tool 40 can make a groove 42 into the top surface of the workpiece 14a when platform 18a is placed into the base 16, as shown in FIG. 4.

Figure 5:
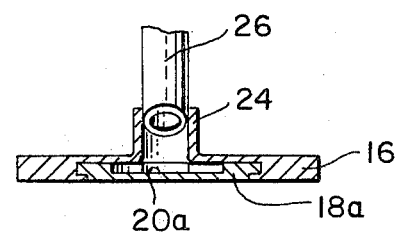
FIG. 5 of the drawing is a cross-sectional view taken on line 5—5 in FIG. 4.

FIG. 5 is similar to FIG. 2, except that it shows the flat air chamber 20a on the platform 18a in level relationship with the base 16.

Figure 6:
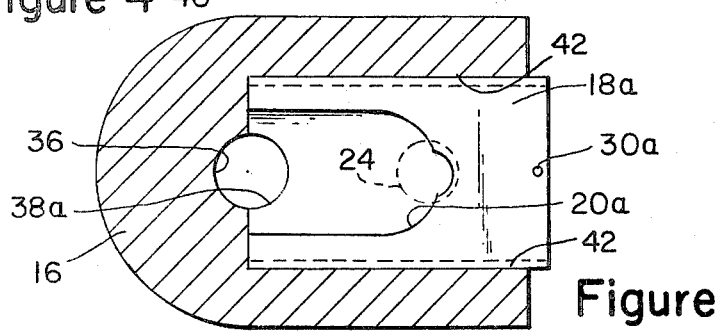
FIG. 6 of the drawing is a cross-sectional view taken on line 6—6 in FIG. 4.

FIG. 6 is similar to FIG. 3, except that it shows the flat air chamber 20a in the platform 18a much wider than the air chamber 20 in FIG. 3.

The power tool waste collector can be made of any suitable material, such as aluminum, stainless steel, plastic, etc. or any other material that will hold up in use.

While the form of apparatus herein described constitutes a preferred embodiment of the invention, it is understood that the invention is not limited to this precise form of apparatus and that changes may be made therein without departing from the scope of this invention.

Having regard to the foregoing disclosure the following is claimed as the inventive and patentable embodiments thereof:

1. A power tool waste collector which comprises:
   (a) a base affixed to a power tool having an aperture, a vacuum hose neck and track;
   (b) a platform having an aperture and a flat air chamber that is level with the said base and is slidably attached by a track in said base;
   (c) a first post affixed to the rear of the base;
   (d) a second post affixed to the rear of the platform;
   (e) a tension spring attached between the first post and the second post to keep the platform against the workpiece; and
   (f) a vacuum hose attached to the vacuum hose neck to vacuum waste created by the power tool.

2. A power tool waste collector which comprises:
   (a) a base affixed to a power tool having an aperture, a vacuum hose neck and track;
   (b) a platform having an aperture and an air chamber that is lower than the said base and is slidably attached by a track in said base;
   (c) a first post affixed to the rear of the base;
   (d) a second post affixed to the rear of the platform;
   (e) a tension spring attached between the first post and the second post to keep the platform against the workpiece;
   (f) a vacuum hose attached to the vacuum hose neck to vacuum waste created by the power tool; and
   (g) a half segment of a round hollow brush affixed to the free end of the platform said brush being lower than the surface of the workpiece, said brush used to direct the waste material into the aperture of the base.

* * * * *